Figure 1:
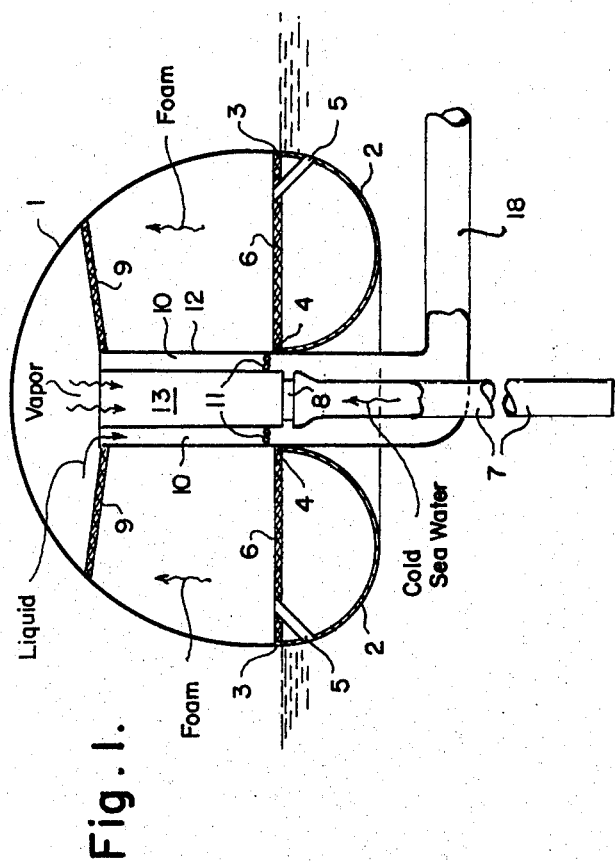

— ## United States Patent [19]

Molini et al.

[11] 4,249,383
[45] Feb. 10, 1981

[54] METHOD AND APPARATUS FOR OBTAINING ELECTRICAL POWER FROM SEA WATER AND OTHER LIQUIDS

[76] Inventors: Alberto E. Molini, 5335 Beeler St., Pittsburgh, Pa. 15217; Clarence Zener, 3995 Bigelow Blvd., Pittsburgh, Pa. 15213

[21] Appl. No.: 46,667

[22] Filed: Jun. 8, 1979

[51] Int. Cl.³ .............................................. F03G 7/04
[52] U.S. Cl. ........................................ 60/641; 60/685; 60/714
[58] Field of Search ................. 60/641, 690, 693, 698, 60/714, 685; 290/1 R, 42, 53

[56] References Cited

U.S. PATENT DOCUMENTS

| | | | |
|---|---|---|---|
| 3,805,515 | 4/1974 | Zener | 60/641 |
| 3,995,160 | 11/1976 | Zener et al. | 60/641 X |
| 4,083,189 | 4/1978 | Fetkovich | 60/641 |
| 4,189,924 | 2/1980 | LaCoste | 60/641 |

FOREIGN PATENT DOCUMENTS 2737539  3/1979  Fed. Rep. of Germany ............. 60/693

OTHER PUBLICATIONS

*Mechanical Engineering*, Apr. 1966, pp. 42–46, Anderson, J. Hilbert and Anderson, James H. Jr., "Thermal Power From Seawater".
TRW Ocean Thermal Energy Conversion: Test Facilities Study, Final Report, vol. 2, Sep., 1976, pp. 6.1–6.35, TID-2781512, Contract EY-76-C-03-1158.
Van Hemelryck, Ludo, "Sea Thermal Power Cycles", presented during the Fourth OTEC Conference in New Orleans in 1976.

*Primary Examiner*—Allen M. Ostrager
*Assistant Examiner*—Stephen F. Husar
*Attorney, Agent, or Firm*—Buell, Blenko, Ziesenheim & Beck

[57] ABSTRACT

An improved method and apparatus for producing electricity utilizing the enthalpy released by a rising foam in a plurality of closed environments to generate power to drive a turbine. The closed environments are interconnected in a manner to permit the effluent from each closed environment to be used in an adjacent closed environment.

7 Claims, 2 Drawing Figures

U.S. Patent
Feb. 10, 1981
4,249,383

METHOD AND APPARATUS FOR OBTAINING ELECTRICAL POWER FROM SEA WATER AND OTHER LIQUIDS

This invention relates to an improved method and apparatus for producing useful electrical power from the temperature differential from the ocean and other liquids and particularly for the most efficient utilization of the cold liquid water used as the heat sink.

The present invention is an improvement of the method and apparatus for obtaining electrical power from sea water described in U.S. Pat. No. 3,599,160 issued Nov. 30, 1976 to Clarence Zener and John G. Fetkovich. In that patent the inventors described a dome-like structure in which warm water from near the surface of the ocean is formed into a foam. The foam rises within the structure to the top where it is separated into its liquid and vapor components. The liquid is conducted to a turbine where it generates electrical power and then is expelled from the dome into the sea. That invention provided an increase in efficiency and a reduction in cost of producing electrical power from sea water. It also provided a comparatively inexpensive and substantially pollution-free apparatus for producing electrical power which does not demand large quantities of natural resources that are in limited supply.

The apparatus and method of U.S. Pat. No. 3,559,160 use warm ocean surface water at approximately 25° C. as the heat source and cold deep ocean water at approximately 5° C. as the heat sink achieving a temperature difference of approximately 20° C. to drive the turbine. The heat source, warm ocean water, is readily available at low cost. The expensive item is the heat sink or the cold deep ocean water.

Although the system of U.S. Pat. No. 3,559,160 has been extensively studied by those skilled in the art, no one has developed a more efficient system employing the concepts of U.S. Pat. No. 3,559,160. Furthermore, no one has suggested that the expensive cold deep ocean water can be used in any other way to improve its per unit power output.

The method and apparatus of this invention provide a means of increasing the per unit power output of the cold deep ocean water. This is accomplished by reusing the liquid which was expelled from the single dome unit in similar additional units. In the successive units the expelled liquid is used in place of the fresh cold deep ocean water which is pumped from the bottom of the ocean for the initial unit or a single unit. By connecting a series of such domes wherein each successive dome uses the effluents from the previous dome as its cold water source, we can construct a system having significantly improved overall efficiency with respect to cold water utilization and lower per unit operating costs.

The method and apparatus of this invention can be used with an existing single dome unit or a series of domes can be constructed at the same time. Therefore, the builder has the option of building the complete system in stages rather than all at once. Furthermore, the multiple dome system may be located on coastland, on the ocean, or partially on land and partially in the ocean. The structural supports for each dome unit may vary according to which location is chosen.

In a preferred embodiment of our designed invention, we provide a plurality of dome-like structures to separate and insulate the interior of each plant from atmospheric pressure.

The first dome has a radius and height of about 600 feet or less. Each successive dome has an increased radius and decreased height. The walls of each dome are made of reinforced concrete. Inlet means are provided through each structure to permit transfer of the surface water into the dome and onto the surface of a foam generating means. A foam breaker for separating the vapor and liquid phases of the dome is set approximately 575 feet or less depending upon the dome radius above the surface of the foam generating surface. Means are provided for transport of the liquid separated from the foam to the turbines, which are at approximately the level of the foam generating area. Means are also provided for collection and transport of the vapor to a spray condenser. The coolant for the condenser of the first unit is brought up from the deep ocean water. The exhaust liquid from the turbine and the condensed vapor are pumped through exhaust ports to the next dome structure and used in its spray condenser as the cold water.

In operation, cold deep ocean water is drawn through a conduit into the condenser in the first dome at approximately 34 feet above sea level. Warm surface water is fed into the dome through inlet ports and transferred to the foam generating means. The higher temperature surface water and the lower temperature deep ocean water are now in proximity of each other in the closed environment. The presence of the higher temperature and lower temperature water in the closed environment of the domes results in pressure gradients within the domes and also reduces the pressure of the warmer water to a value below its saturation vapor pressure. This decrease below the saturation vapor pressure causes the warmer water to evaporate. A foam inducing medium is introduced by a foam forming means into the warmer water and causes the formation of a foam. As a result of the pressure gradients, the foam flows toward the colder water zones of the domes and comes into contact with the foam separator means where the liquid phase and vapor phase are separated. The liquid phase is then transported by conduit means to the turbine and the vapor phase is transported to the condenser and both are pumped through exhaust ports to the ocean. The flow of the liquid phase over the turbine is used to generate electricity.

By reusing in successive domes the effluent from the first dome one can increase by up to 2.3 times the power production capability per unit mass of cold water, thus reducing the cost of the most expensive single item of a single unit system. Also, the warmed effluent from the last stage could be utilized to enrich the nutrient value and carbon dioxide absorption capacity of the ocean waters near to the surface. Ejection of the effluent from the last unit nearer the ocean surface will also minimize the possibility of warming the cold water near the inlet of the first dome.

Other details, objects and advantages of the invention will become apparent as a present preferred embodiment of the invention proceeds.

Figure 2:
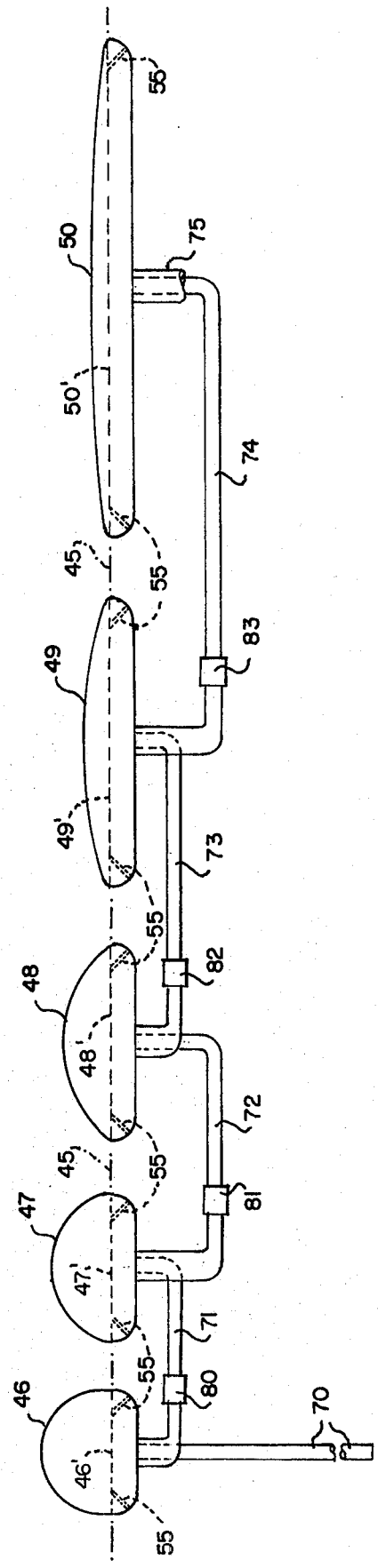

In the accompanying drawings, we have shown a present preferred embodiment of the invention in which:

FIG. 1 is a schematic view of an individual dome unit showing its internal structure; and FIG. 2 is a schematic view of a preferred embodiment of this invention having five dome units.

Referring to FIG. 1 we have shown the internal structure of the dome unit. Although the height and diameter of each dome may vary the internal structure of each unit is similar. Each dome is an electrical generating plant which uses the physical, mechanical and thermodynamic properties of an ocean water foam generated within the unit. The units are constructed of reinforced concrete of sufficient thickness to enable them to withstand atmospheric pressure without crushing or buckling. Each dome 1 is supported by buoyant structure 2. Structure 2 is made of steel and contains a vapor to provide buoyancy. Dome 1 engages edge 3 of structure 2 so as to seal the interior of the dome from atmospheric pressure. Edge 4 of structure 2 supports the various conduits and operational equipment of the plant. The support structure can be modified for domes to be located on land.

Intake ports 5 carry warm surface water into the dome and onto a foam generating means 6. For the foam generating means we prefer to use an apparatus having a plurality of minute orifices through which a mixture of air and water vapor can be fed into the warm surface water that has entered the dome. Cold water is fed through pipe 7 into the condenser 8 located in the center of the dome. Foam generated within the dome rises from the foam generator 6 to a foam separator 9 the foam separator 9 is supported by structure 2 above the foam generator 6. The foam separator can be a turbine fan which centrifugally separates the vapor and liquid phases of the foam. The liquid is then carried through conduits 10, to drive turbine 11. Conduits 10 are enclosed in shield 12 to preserve the stream-line upward flow of the foam. The separated vapor phase is carried by conduit 13 to condenser 8 where it is condensed by means of the cold deep water. The condensed vapor and exhaust liquid from the turbine are removed from the dome through outlet 18.

In operation the warmer surface water would be conducted into the closed environment of the dome through intake 5 onto foam generating means 6 and colder deep water would be conducted to the condenser through pipe 7. The presence of the warmer and colder water at saturated vapor pressure in the closed environment isolated from atmospheric pressure results in evaporation of the warmer water. Water vapor is introduced into the warmer water through a plurality of small orifices by the foam generating means 6. The pressure gradients within the dome causes the vapor to rise and contact foam separator 9. The liquid and vapor phases are separated and the liquid is used to propel turbines 11 and then is exhausted to the ocean. The vapor is condensed by condenser 8 and also exhausted to the ocean. The energy of the rotating turbines is converted to electrical energy by a generator, not shown.

A plurality of domes are connected in series in a manner to permit the exhaust fluid from the first dome to be used in the second dome, the exhaust fluid of the second dome to be used in the third dome, and so on through the last dome. The exhaust liquid of the last dome will be returned to the ocean. Any number of domes can be connected in such a fashion. The optimum number of domes to be used in the system is dependent upon the temperatures of the cold water injected into the first dome and the temperature of the warmer surface water. This is true because some heating of the cold water will occur in each dome.

For a temperature differential of 20° C. we have calculated that a series of five units will provide the maximum obtainable power per unit mass of cold deep ocean water. Such a system will increase by $2\frac{1}{3}$ times the total power product capability per unit mass of cold water over a single unit when the temperature of the cold water used in the first dome is 5° C. and the temperature of the surface water is 25° C.

A five unit system is illustrated in FIG. 2. Each unit has the internal structure illustrated in FIG. 1. Warm surface ocean water is fed into each unit through inputs 55. Cold ocean water is pumped from the bottom of the ocean into the first dome unit 46 through pipe 70 into a condenser (see FIG. 1). The liquid phase of the foam, the condensed vapor phase and cold water from the condenser is expelled from the first dome through conduit 71 and pumped by pump 80 into the second unit 47. The second dome and all successive domes operate in the same manner as the first dome except that the exhaust liquid from the first dome is used in place of the cold ocean water used in the first dome. The exhaust liquid from the second dome is pumped by pump 81 through pipe 72 into the third dome 48. Exhaust liquid from the third dome is pumped by pump 82 to the fourth dome 49 through pipe 73. The exhaust liquid from the fourth dome is pumped by pump 83 into the fifth dome 50 through pipe 74. The exhaust liquid from the fifth dome is expelled into the ocean through output pipe 75. The pipes connecting the domes should be insulated to prevent heat loss. The foam generation means contained in each dome is shown by a dash lines 46' through 50'. The level of the water on which the domes float is shown by chain line 45.

The recovery of thermal energy is equal to $[C_p(\Delta T_H)^2/2T_H]$
where:
 $C_p$ = specific heat of warm and cold waters
 $\Delta T_H$ = change in temperature of the warm water input
 $T_H$ = original temperature of the warm water input.
Since that fraction must be equal to the energy recovered from the increase in potential energy achieved by raising the foam, it then follows that the height of each unit will be directly proportional to the square of the change in temperature of the warm water which was fed into the dome. That temperature change is directly affected by the temperature of the cold water input. Consequently, the height of each dome in the series should become progressively smaller.

The area of foam formation should become progressively larger. Assuming the same foam generation rate the needed area for foam formation can be estimated from the ratio of the warm water flow rates going into each unit. Those rates are directly affected by the temperature difference between the effluent and the warm water input. Because that difference is affected by the temperature of the cold water input, which varies among units, the foam generation area should also vary among units.

Tables I and II gives the relative heights and foaming areas for a four unit and a five unit system.

TABLE I

| Four Stage Unit Where $\Delta T_c = 4.15°$ C. per stage | | | | | |
|---|---|---|---|---|---|
| Stage(n) | $I_c$ | $I_H$ | $\Delta T_H$ | $A_{fn}/A_{fl}$ | $h_n/h_l$ |
| 1 | 1 | .2618 | 15.85 | 1 | 1 |
| 2 | 1.262 | .447 | 11.70 | 1.70 | .545 |
| 3 | 1.709 | .939 | 7.55 | 3.587 | .227 |
| 4 | 2.646 | 3.233 | 3.40 | 5.230 | .046 |

TABLE II

| Five Stage Unit Where $\Delta T_c = 3.45$ per stage | | | | | |
|---|---|---|---|---|---|
| Stage(n) | $I_c$ | $I_H$ | $\Delta T_H$ | $A_{fn}/A_{fl}$ | $h_n/h_l$ |
| 1 | 1 | .208 | 16.55 | 1 | 1 |
| 2 | 1.208 | .318 | 13.10 | 1.5288 | .626 |
| 3 | 1.526 | .545 | 9.65 | 2.6202 | .340 |
| 4 | 2.07 | 1.153 | 6.20 | 5.543 | .140 |
| 5 | 3.22 | 4.047 | 2.75 | 19.457 | .028 |

Where
 n=stage
 $I_c$=cold water input, mass flow rate
 $I_H$=warm water input, mass flow rate
 $\Delta T_H$=change in temperature of warm water input
 $A_{fn}$=foam generation area of stage n
 $h_n$=height of stage n
 $\Delta T_c$=change in temperature of cold water input Although we have shown the preferred embodiment of this invention utilizing ocean water as the operating liquid for the production of electricity, other liquids can also be used. For example, this invention may be used in conjunction with an industrial process in which a cold liquid is drawn from a supply, heated during the process and expelled. Cold liquid could be drawn into the domes from the same supply and the heated liquid expelled from the process would be the warm liquid used in the domes.

While we have shown and described a present preferred embodiment of the invention and have illustrated a present preferred method of practicing the same, it is to be distinctly understood that the invention is not limited thereto but may be otherwise variously embodied within the scope of the following claims.

We claim:

1. An improved method of producing electrical energy of the type comprising
   i. conducting a warm liquid into a closed environment isolated from atmospheric pressure onto a foam generating means,
   ii. conducting colder liquid into said closed environment,
   iii. generating a foam in the evaporating warmer liquid,
   iv. separating said foam into liquid and vapor phases,
   v. conducting said liquid phase to turbine means,
   vi. conducting said vapor phase to a condenser for condensing said vapor, and
   vii. exhausting said liquid and condensed vapor, wherein the improvement comprises repeating, at least once, the following steps:
   (a) collecting rather than exhausting said liquid,
   (b) conducting said liquid to a second closed environment isolated from atmospheric pressure,
   (c) conducting warmer liquid into said closed closed environment and onto a foam generating means,
   (d) generating a foam in the evaporating warmer liquid,
   (e) separating said foam into liquid and vapor phases,
   (f) conducting said liquid phase to turbine means,
   (g) conducting said vapor phase to a condenser for condensing said vapor,
   (h) exhausting said condensed vapor, and
   (i) exhausting said liquid.

2. The method of claim 1 in which steps (a) through (i) are repeated once.

3. The method of claim 1 in which steps (a) through (i) are repeated twice.

4. The method of claim 1 in which steps (a) through (i) are repeated three times.

5. The method of claim 1 in which the liquid is ocean water.

6. A plant for generating electric power comprising:
   (a) a plurality of domes, each having support means for said dome, said support means engaging said dome to isolate the interior of said dome from the atmosphere, intake means for conducting warm ocean water into said dome and onto foam generating means, conduit means to conduit colder ocean water into the closed environment within said dome, foam separator means supported by said support means above said foam generator means, conduit means within said dome and supported by said structure for conducting the liquid phase of said foam to a turbine, conduit means within said dome and supported by said structure for conducting the vapor phase of said foam to condenser means; and exhaust means for expelling said liquid and condensed vapor to the ocean, and
   (b) a plurality of conduit means connecting said domes in series and joining the exhaust means of the first dome to the cold water input means of the second dome and likewise connecting each successive dome to its predecessor.

7. The apparatus of claim 6 wherein the support means are buoyant.

* * * * *